(12) United States Patent
Howie et al.

(10) Patent No.: US 10,967,777 B2
(45) Date of Patent: Apr. 6, 2021

(54) LIFT ASSIST DEVICE FOR FLUSH FLOOR SLIDE-OUT ROOM

(71) Applicant: Lippert Components, Inc., Elkhart, IN (US)

(72) Inventors: Mark Howie, Edwardsburg, MI (US); Patrick Quigley, South Bend, IN (US); Jeremiah Bradley, Nappanee, IN (US); James Clay, Granger, IN (US)

(73) Assignee: LIPPERT COMPONENTS, INC., Elkhart, IN (US)

( * ) Notice: Subject to any disclaimer, the term of this patent is extended or adjusted under 35 U.S.C. 154(b) by 133 days.

(21) Appl. No.: 16/527,407

(22) Filed: Jul. 31, 2019

(65) Prior Publication Data

US 2020/0039416 A1 Feb. 6, 2020

Related U.S. Application Data

(60) Provisional application No. 62/713,809, filed on Aug. 2, 2018.

(51) Int. Cl.
*B60P 3/39* (2006.01)
*B60P 3/34* (2006.01)

(52) U.S. Cl.
CPC ...................... *B60P 3/34* (2013.01)

(58) Field of Classification Search
CPC ............ B01D 17/0202; B01D 17/0208; B01D 17/0214; B01D 17/045; B01D 47/10
See application file for complete search history.

(56) References Cited

U.S. PATENT DOCUMENTS

| | | | |
|---|---|---|---|
| 5,577,351 A | 11/1996 | Dewald, Jr. et al. | |
| 5,902,001 A * | 5/1999 | Schneider | B60P 3/34 296/171 |
| 5,984,396 A | 11/1999 | Schneider | |
| 6,176,045 B1 * | 1/2001 | McManus | B60P 3/34 296/26.09 |
| 6,182,401 B1 * | 2/2001 | McManus | B60P 3/34 296/26.09 |
| 6,202,362 B1 | 3/2001 | McManus et al. | |
| 6,286,883 B1 * | 9/2001 | Schneider | B60P 3/34 296/165 |
| 6,293,611 B1 * | 9/2001 | Schneider | B60P 3/34 296/165 |
| 6,345,855 B2 * | 2/2002 | Hanser | B60P 3/34 296/165 |
| 6,402,216 B1 * | 6/2002 | McManus | B60P 3/34 296/165 |
| 6,428,073 B1 * | 8/2002 | Blodgett, Jr. | B60P 3/34 296/171 |
| 6,598,354 B2 | 7/2003 | McManus et al. | |
| 6,637,794 B2 | 10/2003 | McManus et al. | |

(Continued)

*Primary Examiner* — Kiran B Patel
(74) *Attorney, Agent, or Firm* — Nixon & Vanderhye P.C.

(57) ABSTRACT

A lift assist device for a slide-out room includes a base and a floor support having a fixed portion, a deflecting portion, and a biasing member disposed between the base and the deflecting portion. When the slide out room is in an extended position, the weight of the room deflects the deflecting portion, thereby compressing the biasing member. As the slide-out room is being retracted from the extended position, the biasing member decompresses, thereby facilitating lifting of the slide-out room.

17 Claims, 8 Drawing Sheets

(56) References Cited

U.S. PATENT DOCUMENTS

| | | | |
|---|---|---|---|
| 6,702,353 B1 | 3/2004 | Blodgett, Jr. | |
| 6,928,773 B1 | 8/2005 | Gardner | |
| 7,011,351 B1* | 3/2006 | Crean | B60P 3/34 296/26.01 |
| 7,083,213 B1* | 8/2006 | Crean | B60P 3/34 296/165 |
| 7,293,814 B2 | 11/2007 | Blodgett, Jr. | |
| 7,316,439 B1* | 1/2008 | Crean | B60P 3/34 296/171 |
| 7,334,827 B1* | 2/2008 | Crean | B60P 3/34 296/26.01 |
| 9,855,880 B1 | 1/2018 | Pham | |
| 2004/0130172 A1* | 7/2004 | Yoder | B60P 3/34 296/26.01 |
| 2004/0174031 A1* | 9/2004 | Rasmussen | B60P 3/34 296/26.01 |
| 2005/0179277 A1* | 8/2005 | Schneider | B60P 3/34 296/26.01 |
| 2005/0184546 A1* | 8/2005 | Kunz | A47B 21/0073 296/26.01 |
| 2005/0230990 A1* | 10/2005 | Rincoe | B60P 3/34 296/26.13 |
| 2006/0076798 A1* | 4/2006 | Kunz | B60P 3/34 296/175 |
| 2006/0273606 A1* | 12/2006 | Rasmussen | B60P 3/34 296/26.13 |
| 2007/0194586 A1* | 8/2007 | Gardner | B60P 3/34 296/26.13 |
| 2008/0315607 A1* | 12/2008 | Herson | B60P 3/34 296/26.13 |
| 2009/0033116 A1* | 2/2009 | Dixon | B60P 3/34 296/26.13 |
| 2013/0106130 A1* | 5/2013 | Yoder | F16H 19/04 296/26.02 |
| 2016/0243974 A1* | 8/2016 | Goode | F16J 15/027 |
| 2017/0080842 A1* | 3/2017 | Rodabaugh | B60P 3/34 |
| 2017/0080843 A1* | 3/2017 | Rodabaugh | B60P 3/34 |
| 2018/0001842 A1* | 1/2018 | Dame | E04B 1/346 |
| 2018/0079348 A1* | 3/2018 | Ronsen | B60P 3/34 |
| 2019/0092212 A1* | 3/2019 | Garceau | B60P 3/34 |
| 2019/0308548 A1* | 10/2019 | VanOrt | B60P 3/34 |
| 2020/0062164 A1* | 2/2020 | Garceau | B60P 3/34 |
| 2020/0200243 A1* | 6/2020 | Carlson | F16H 25/2015 |
| 2020/0317143 A1* | 10/2020 | Goode | B60R 13/07 |

\* cited by examiner

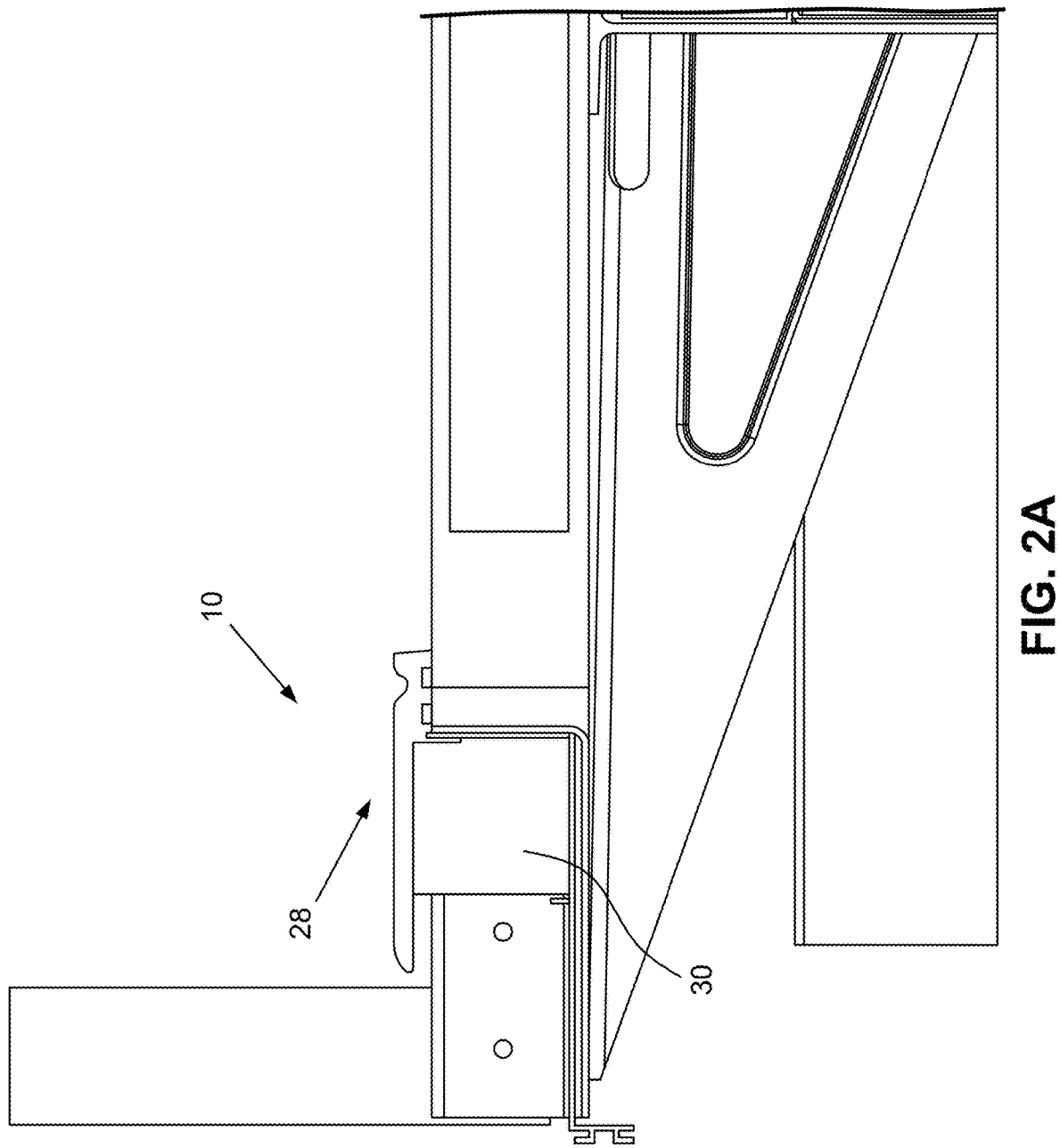

LIFT ASSIST DEVICE FOR FLUSH FLOOR SLIDE-OUT ROOM

CROSS-REFERENCES TO RELATED APPLICATIONS

This application claims the benefit of U.S. Provisional Patent Application No. 62/713,809, filed Aug. 2, 2018, the entire content of which is herein incorporated by reference.

STATEMENT REGARDING FEDERALLY SPONSORED RESEARCH OR DEVELOPMENT (NOT APPLICABLE)

BACKGROUND

It is known in the art provide a recreational vehicle (RV) with one or more slide-out rooms. Such slide-out rooms may be extended through a wall of the RV to expand the interior space thereof when the vehicle is parked, and retracted into the vehicle when the vehicle is in transit or not in use.

The floor of such a slide-out room necessarily is situated above the floor of the RV when the slide-out room is retracted. Some known slide-out room operating mechanisms are configured to simply extend and retract the room laterally through the wall of the vehicle, without moving the slide-out room vertically with respect to the RV. Accordingly, such operating mechanisms place the floor of the slide-out room at a greater height than the floor of the RV when the slide-out room is extended. This may be undesirable both functionally and aesthetically.

Other known slide-out room operating mechanisms are configured to lower the slide-out room when extended so that the floor of the slide-out room is flush with the floor of the RV when the slide-out room is extended. Similarly, such slide-out room operating mechanisms are configured to raise the slide-out room when retracted so that slide-out room may be drawn into the RV without interference.

BRIEF SUMMARY

A slide-out room can be relatively heavy. This fact can make difficult the lowering and raising of the slide-out room as it is being extended and retracted. Various means have been developed to facilitate the lowering and raising. One such means involves the use of ramp structures at the interface between the floor of the RV and the floor of the slide-out room. Another such means involves the use of a biasing mechanism to bias the room in an upward direction.

In an exemplary embodiment, a lift assist device is configured for use with a structure having a structure floor defining an edge, a wall defining an opening, and a slide-out compartment having a compartment floor. The slide-out compartment is configured to reciprocate through the opening between a retracted position in which the compartment floor is disposed above the structure floor and an extended position in which the compartment floor is disposed substantially level with the structure floor. The lift assist device includes a biasing member, a base configured to receive and retain the biasing member, and a floor support including a fixed portion configured for connection to the structure and a deflecting portion connected to the fixed portion. The biasing member is disposed between the base and the deflecting portion, and the biasing member is configured to bias the deflecting portion in a first deflection direction with respect to the base.

The device may also include a hinge portion disposed between the fixed portion and the deflecting portion. The hinge portion may include a region of reduced thickness compared to thicknesses of the fixed portion and the deflecting portion, respectively, adjacent the hinge portion. The fixed portion, the deflecting portion, and the hinge portion may be made of the same material. The fixed portion, the deflecting portion, and the hinge portion may be monolithically formed with each other. In some embodiments, the hinge portion may include a flexible material disposed between the fixed portion and the deflecting portion, where both the fixed portion and the deflecting portion may be made of a material different from the flexible material. Alternatively, the deflecting portion may be cantilevered from the fixed portion. In this context, the deflecting portion may be bendably connected to the fixed portion.

In another exemplary embodiment, a lift assist device includes a base, a floor support cooperable with the base and including a fixed portion and a deflecting portion that is displaceable relative to the fixed portion, and a biasing member interposed between the deflecting portion of the floor support and the base. The deflecting portion is configured to be pivoted into the biasing member by the slide-out room when the floor of the slide-out room is displaced from the fixed portion to the deflectable portion.

The base may include a horizontal first wall and a vertical second wall engageable with the structure such that the base may be L-shaped. The base may further include a vertical third wall spaced from and parallel to the second wall, where the biasing member may be disposed in the space between the third wall and the second wall. The floor support may be made of or may include an inherently lubricious material. The floor support may include a plurality of legs having free ends defining a lower surface of the floor support, where the floor support may further include a flange extending from one of the legs or otherwise from the fixed portion and engaging the base. A free end of the deflecting portion may be beveled.

The floor support further may include a hinge portion between the fixed portion and the deflecting portion, where the deflecting portion may be configured to be pivoted into the biasing member by the slide-out room when the floor of the slide-out room may be displaced from the fixed portion beyond the hinge portion. The fixed portion, the hinge portion and the deflecting portion may be integrally formed. The hinge portion may include a flexible and resilient material, and the fixed portion and the deflecting portion may be formed of a material different from the hinge portion.

BRIEF DESCRIPTION OF THE DRAWINGS

These and other aspects and advantages will be described in detail with reference to the accompanying drawings, in which:

FIG. 2A is a side elevation view of the lift assist device of FIG. 1 installed in the RV with the slide-out room not shown;

DETAILED DESCRIPTION

Figure 1:
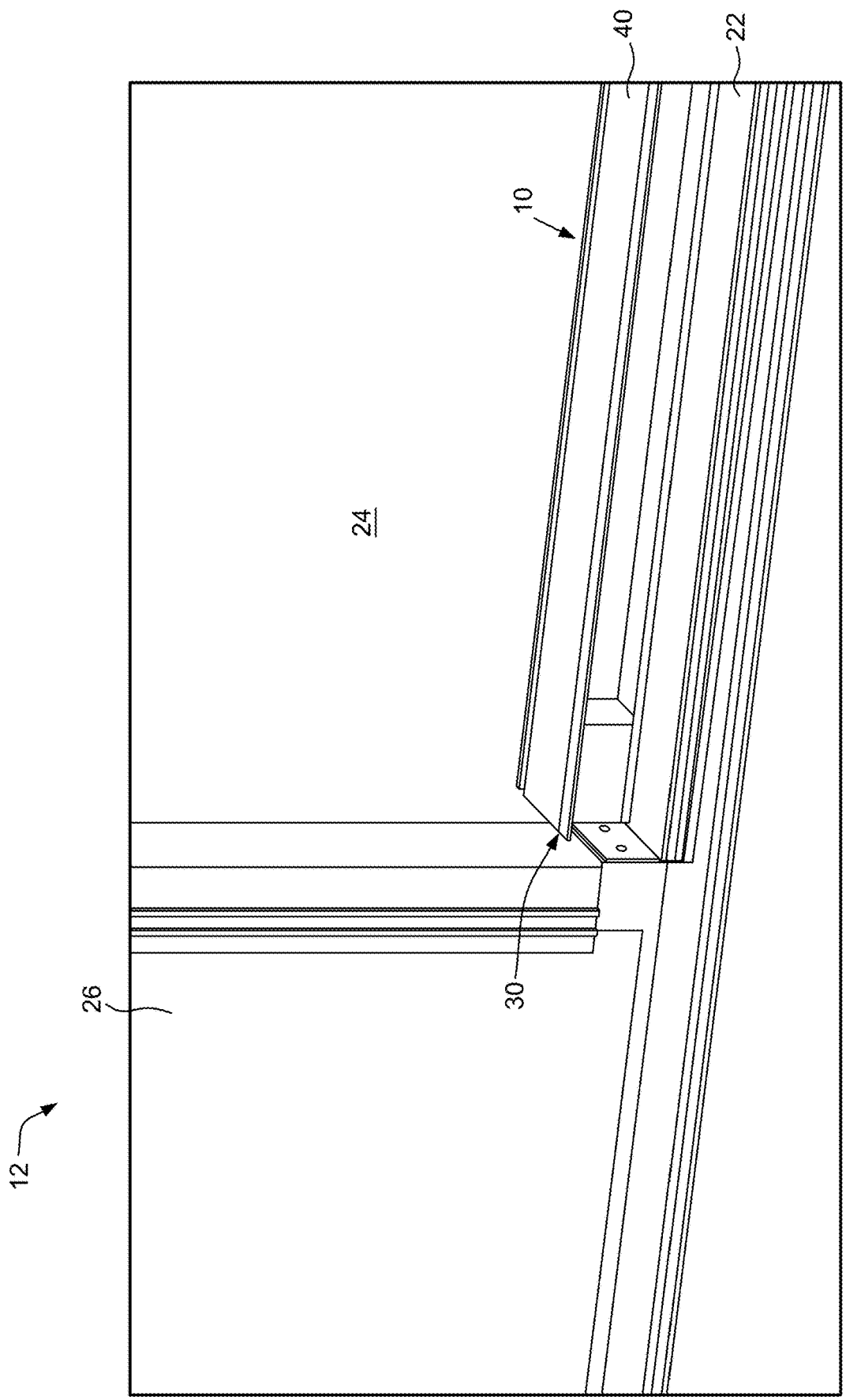
FIG. 1 is a perspective view of an illustrative embodiment of a lift assist device according to the present disclosure installed in an RV.

References to orientation, for example, top, bottom, left, right, vertical, horizontal, and the like as may be used herein are intended to refer to relative orientation, and not absolute orientation, unless context clearly dictates otherwise.

The drawings show illustrative embodiments of a lift assist device 10 for use in connection with a recreational vehicle (RV) or other structure 12 having a flush slide out room (or compartment) 14, that is, a slide out room that can be raised and lowered so that a floor 16 of the slide out room may be configured to be substantially flush with a floor 18 of the RV when the slide out room is deployed and so that the floor of the slide out room may be raised above the floor of the RV to enable retraction of the slide out room into the RV.

The device 10 includes a base 20 configured for connection to a threshold 22 of an opening 24 in a wall 26 of the RV 12 through which the slide out room 14 may be reciprocated, a floor support 28 configured to support, raise, and lower the floor 16 of the slide out room 14 with respect to the floor 18 of the RV, and a biasing member or block 30 operably associated with the base. The threshold 22 may be embodied as or supported by a portion of a frame of the RV, a portion of the wall 26 defining the sill of the opening 24, or otherwise. The threshold 22 and the base 20 may be combined into a single aluminum extrusion.

The base 20 includes a first wall 32 configured for abutment with and/or attachment to a first portion of the threshold 22 and a second wall 34 extending from the first wall and configured for abutment with and/or attachment to a second portion of the threshold 22. As shown, the first wall 32 is configured as a lower or bottom wall configured for abutment with and/or attachment to a horizontal portion of the threshold 22, and the second wall 34 is configured as an end wall configured for abutment with and/or attachment to a vertical portion of the threshold.

As such, the first wall 32 and the second wall 34 are generally perpendicular to each other.

The base 20 also includes a third or stop wall 36 extending generally perpendicularly from the first wall 32, and generally parallel to and spaced from the second wall 34. The first, second, and third walls 32, 34, 36 cooperate to define a trough configured to receive and retain a portion of the biasing member 30. Either or both of the first and second walls 32, 34 may define one or more apertures (not shown) configured to receive mechanical fasteners that may be driven therethrough and into the threshold 22 and/or the RV 12 in order to secure the base 20 to the RV.

In an embodiment, the second wall 34 may be omitted. In such an embodiment, the first wall 32, the third wall 36, and an adjacent portion of the RV, when the base 20 is connected to the RV, may cooperate to define a trough configured to receive and retain the biasing member 30.

The floor support 28 includes a fixed portion 38, a deflecting portion or ramp flap 40, and a hinge portion 42 connecting the fixed portion 38 to the deflecting portion 40.

Figure 4:
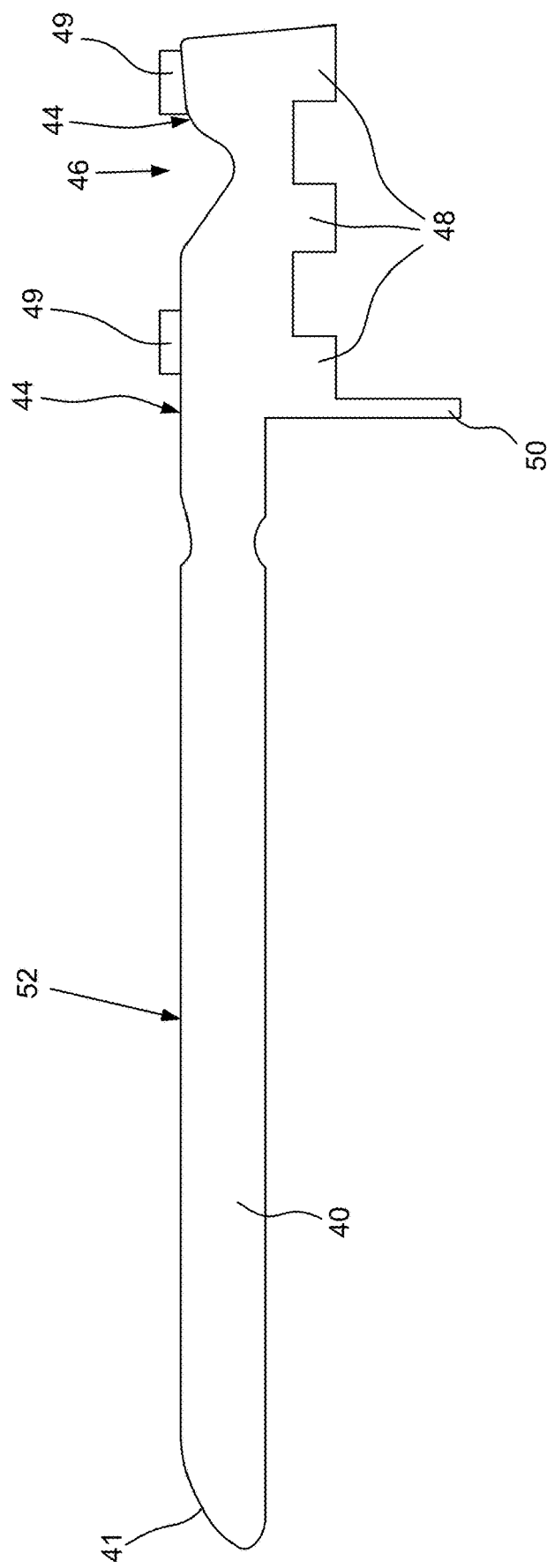
FIG. 4 is a side elevation view of the floor support of FIG. 3.

The fixed portion 38 defines an upper surface 44 configured for engagement with a lower surface of the floor 16 of the slide room 14 or another lower portion of the slide out room. The upper surface 44 may be continuous or discontinuous. If discontinuous, the upper surface 44 may define one or more troughs 46. One or more replaceable wear bars 49 (FIG. 4) made of relatively low friction material, for example, an inherently lubricious material such as Acetal, may be disposed upon or otherwise integrated with the upper surface 44. In an embodiment, at least a portion of the upper surface 44 may be coated or impregnated with a relatively low friction material. In another embodiment, the entire fixed portion 38 may be made of a relatively low friction material.

The fixed portion 38 also defines a lower surface configured for abutment with the threshold 22 or other portion of the RV. The fixed portion 38 may include a plurality of legs 48 having free ends defining the forgoing lower surface. A flange 50 may extend from one of the legs 48 or otherwise from the fixed portion 38. The flange 50 may be configured for connection to the base 20 or to the threshold 22. The fixed portion 38 (including but not limited to the flange 50) may define one or more apertures (not shown) configured to receive mechanical fasteners that may be driven therethrough and into the threshold 22 and/or the RV 12 in order to secure the fixed portion 38 to the RV.

The deflecting portion 40 is configured to deflect with respect to the fixed portion 38. The deflecting portion 40 is shown as an elongated flap pivotably connected to the fixed portion 38 via the hinge portion 42. The deflecting portion 40 defines a generally planar and smooth upper surface 52. In an embodiment, one or more wear bars (not shown, similar to the wear bars 49) made of relatively low friction material may be disposed upon or otherwise integrated with the upper surface 52. Such wear bars may be readily replaceable. In another embodiment, the upper surface 52 may be impregnated or coated with a relatively low friction material. In an embodiment, the entire deflecting portion 40 may be made of a relatively low friction material.

The free end 41 of the deflecting portion 40 may be beveled. A corresponding end 17 of the floor 16 of the slide out room 14 may be beveled in a complementary manner. In such an embodiment, the respective beveled ends 17, 41 of the floor 16 and the deflecting portion 40 may cooperate to facilitate elevation of the floor 16 onto the upper surface 52 of the deflecting portion when the slide out room is retracted into the RV 12, and to facilitate lowering of the floor 16 from the upper surface of the deflecting portion when the slide out room is extended from the RV.

As shown in FIGS. 1-4, the fixed portion 38 and deflecting portion 40 may be monolithically or integrally formed, for example, as an extrusion comprising a single material, for example, a plastic material. In such an embodiment, the hinge portion 42 interconnecting the fixed portion 38 and the deflecting portion 40 may also be integrally formed and embodied, as shown, as an area of reduced material thickness.

Figure 5:
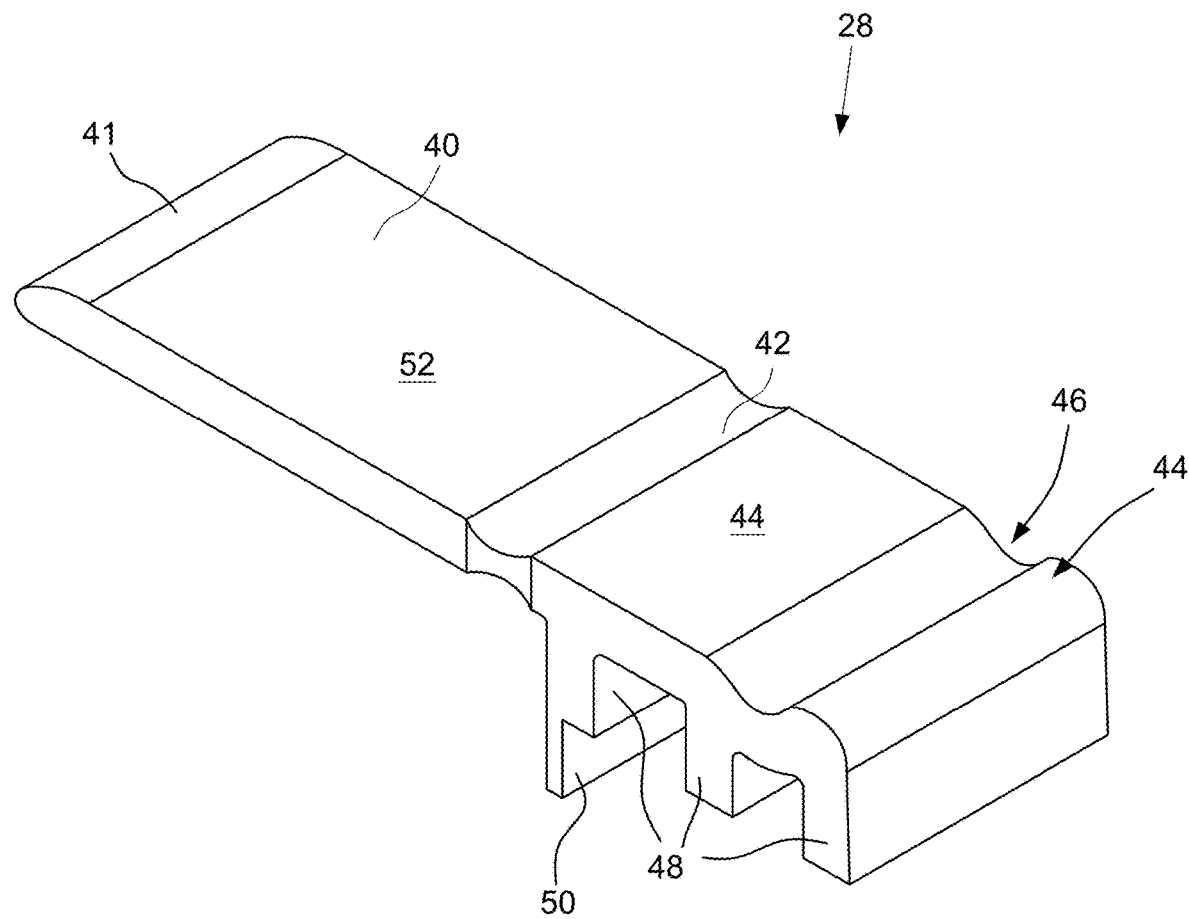
FIG. 5 is a perspective view of an alternative floor support of the lift assist device of FIG. 3.

In another embodiment, as shown in FIG. 5, the hinge portion 42 may be embodied as a flexible and resilient material, different than the material of which either or both of the fixed portion 38 and the deflecting portion 40 are made. In such an embodiment, the hinge portion 42 may be co-extruded with the fixed portion 38 and the deflecting portion 40. In another such an embodiment, the hinge portion 42 may be formed separately from and post attached to either or both of the fixed portion 38 and the deflecting portion 40 using a suitable adhesive or otherwise.

The hinge portion 42 enables the deflecting portion 40 to pivot between first and second positions with respect to the fixed portion 38. In the first position, the upper surface of the deflecting portion 40 is generally parallel to the upper surface of the fixed portion 38. In the second position, the upper surface of the deflecting portion 40 is ramped or angled or declined with respect to the upper surface of the fixed portion. The deflecting portion 40 may be made of a low friction material, or the upper surface of the deflecting portion 40 could be coated, overlaid, or impregnated with a low friction material.

In an embodiment, the fixed portion 38 and the deflecting portion 40 are made of a relatively rigid material, that is, a material sufficiently rigid to support and guide the floor 16 of the slide out room 14 as it is extended and retracted without undue deformation. In another embodiment, the deflecting portion 40 may be sufficiently flexible and resilient to resiliently bend, for example, in the manner of a cantilevered beam, with respect to the fixed portion 38 to an extent sufficient to support and guide the floor 16 of the slide out room 14 as it is extended and retracted. In such an embodiment, the hinge portion 42 may be omitted as a discrete element.

The biasing member or block 30 may be embodied as a block of compressible and resilient material, for example, polyurethane, disposed between the base 20 and the deflecting portion 40. The base 20, deflecting portion 40, and biasing block 30 are configured so that the biasing block 30 may compressibly and resiliently support the deflecting portion and a load, for example, the weight of the slide out room 14, carried thereby. As suggested above, the stop wall 36 of the base 20 inhibits translational displacement (as opposed to mere compression and decompression) of the biasing block 30 with respect to the base.

The base 20 may include locating features 54 for connecting a seal (not shown) to the base. Such a seal may be used to provide an environmental seal between the lift assist device 10 and a corresponding and overlapping outer flange (not shown) of the slide out room 14.

The device 10 may be attached to the threshold 22 of the RV 12 or otherwise to the RV so that the fixed portion 38 of the floor support 28 is oriented toward the interior of the RV and so that the deflecting portion 40 of the floor support is oriented toward the exterior of the RV. The floor support 28 may span the entire width of the slide out room 14 or a greater or lesser amount. The biasing member 30 typically would not span the entire width of the slide out room 14. In an embodiment, a first biasing member 30 would be disposed at or near a first end of the floor support 28, and a second biasing member 30 would be disposed at or near a second end of the floor support. Each of the foregoing biasing members could be sized to have a width of about 1%-10% or about 10%-20% or about 20%-30% of the width of the floor support or wider.

In an embodiment, one or more additional biasing members 30 could be disposed between the biasing member at or proximate the first end of the floor support 28 and the biasing member at or proximate the second end of the floor support.

In use, the slide out room 14 may be extended from and retracted into the RV 12 using any suitable actuation mechanism (not shown). In the course of such extension and retraction of the slide out room 14, the floor 16 or other underside surface of the slide out room may slide across and be supported by the fixed portion 38 and the deflecting portion 40 of the floor support 28.

With the slide out room 14 fully retracted into the RV, as shown in FIG. 2A, a portion of the slide out room may be supported by the fixed portion 38 of the floor support 28. Also, with the slide out room 14 fully retracted into the RV, a portion of the slide out room 14 may be supported by the deflecting portion 40 of the floor support 28. With the slide-out room 14 so positioned, a substantial portion of the weight of the slide-out room may be borne by the fixed portion 38 of the floor support 28, and relatively little, if any, of the weight of the slide out room may be borne by the deflecting portion 40 of the floor support.

Figure 2B:
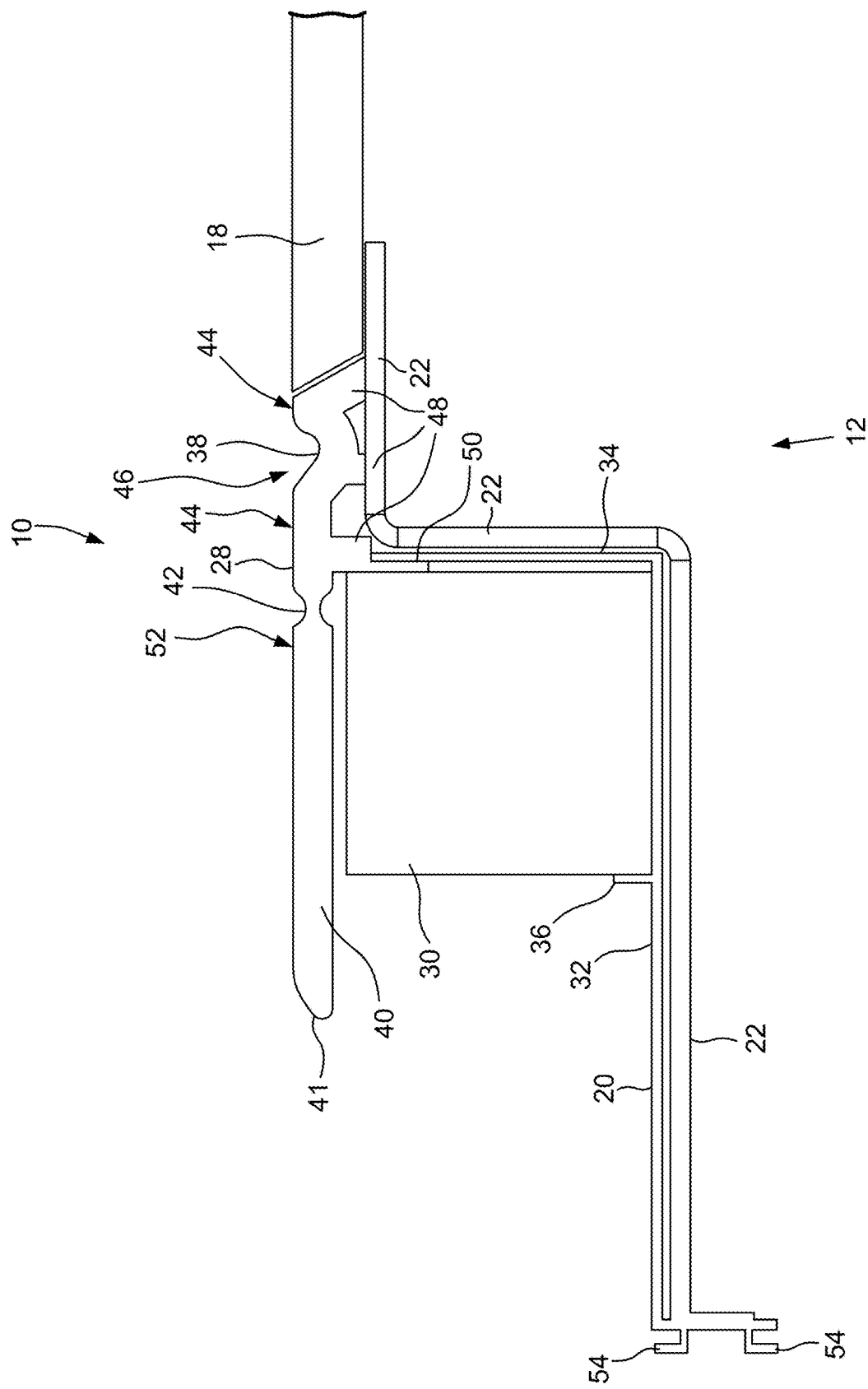
FIG. 2B is a side elevation detail view of the lift assist device of FIG. 1 installed in the RV with the slide-out room not shown.

As the slide-out room 14 is extended from the RV 12, for example, as shown in FIG. 2B, the fixed portion 38 of the floor support 28 may continue to bear a substantial portion of the weight of the slide out room. Also, the deflecting portion 40 of the floor support 28 may begin to bear an increasing amount of the weight of the slide-out room 14.

Figure 2C:
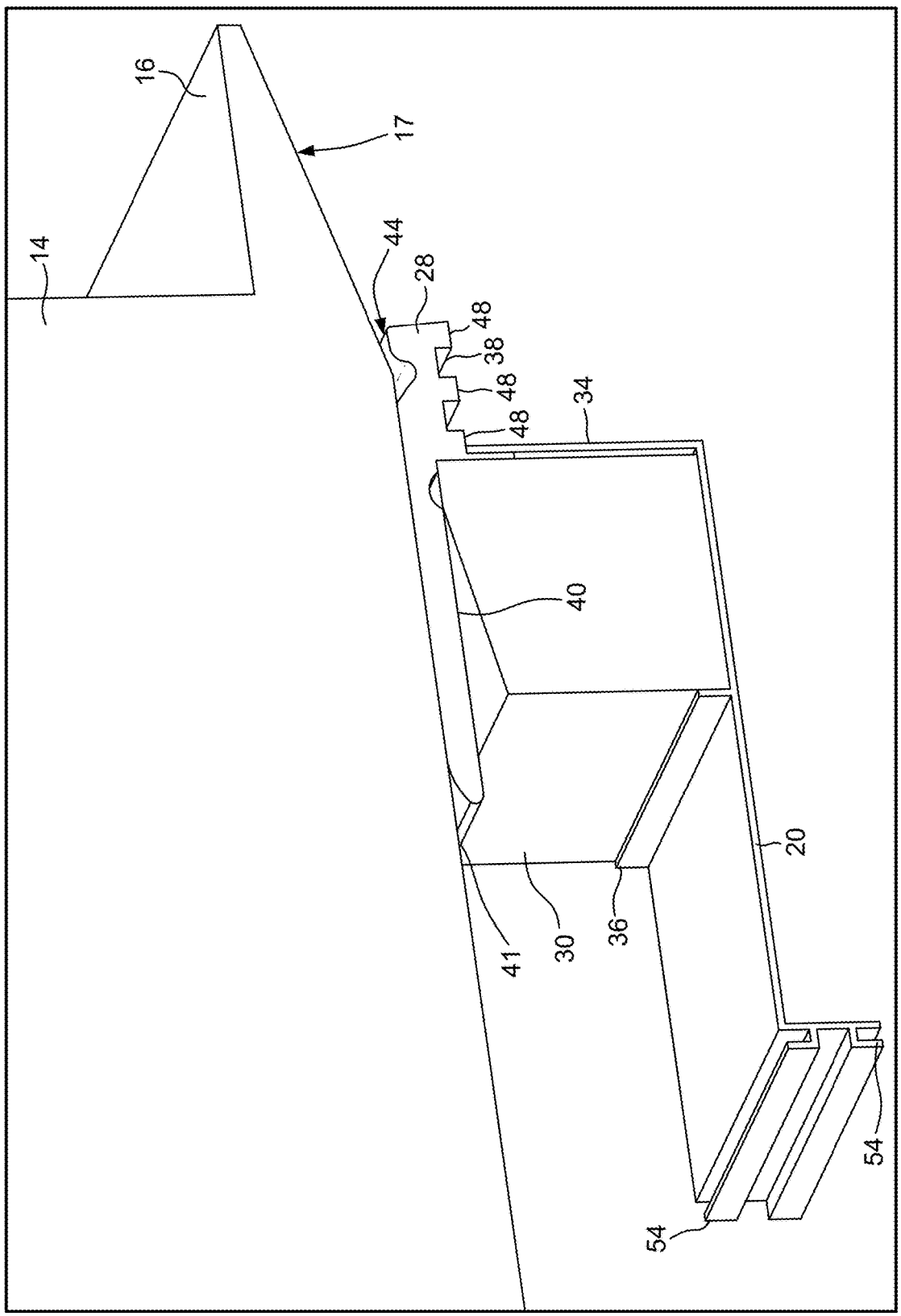
FIG. 2C is a perspective view of the lift assist device of FIG. 1 supporting a slide-out room in a partially extended position.
Figure 2D:
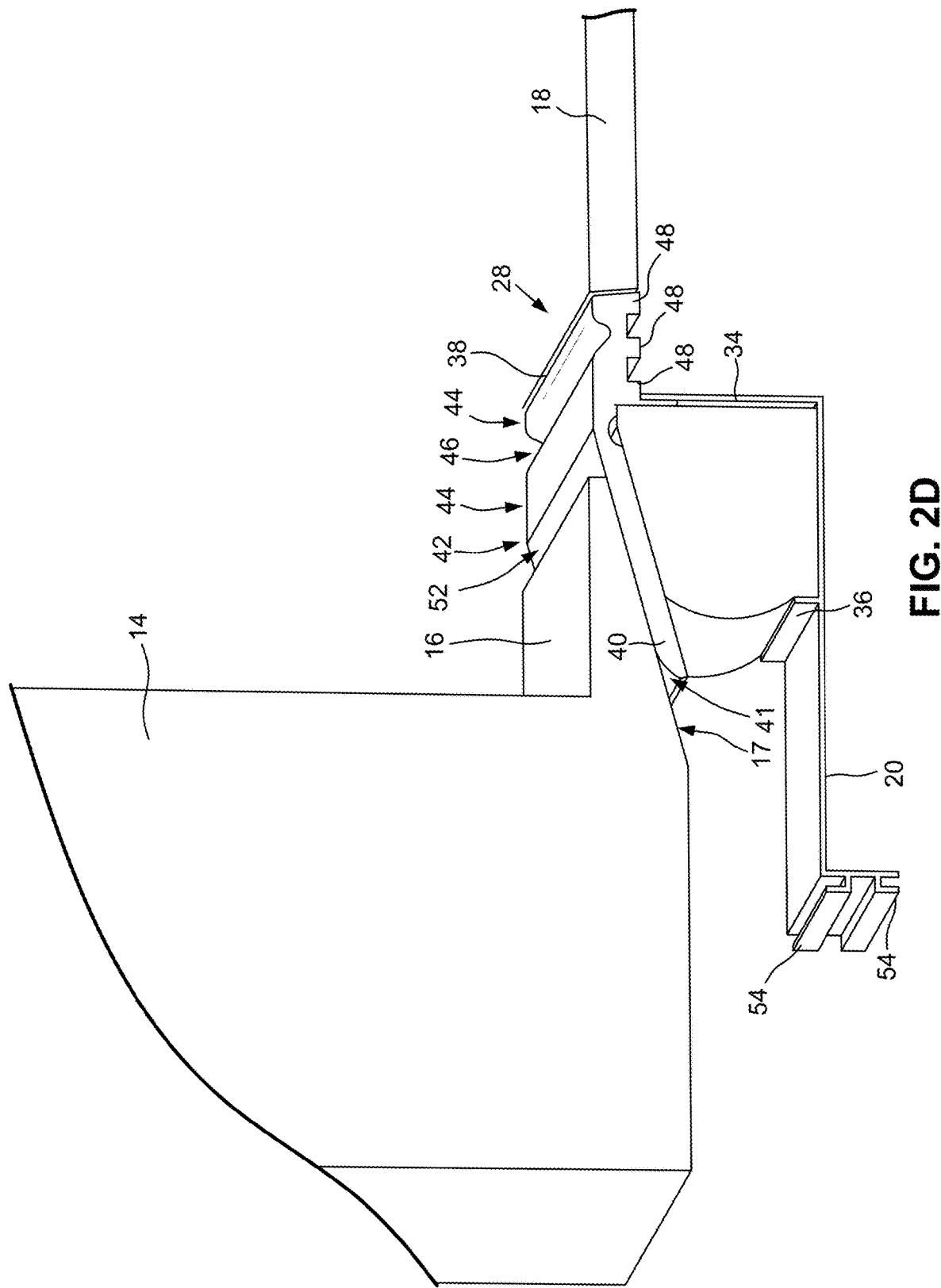
FIG. 2D is a perspective view of the lift assist device of FIG. 1 supporting a slide-out room in a fully extended position.
Figure 3:
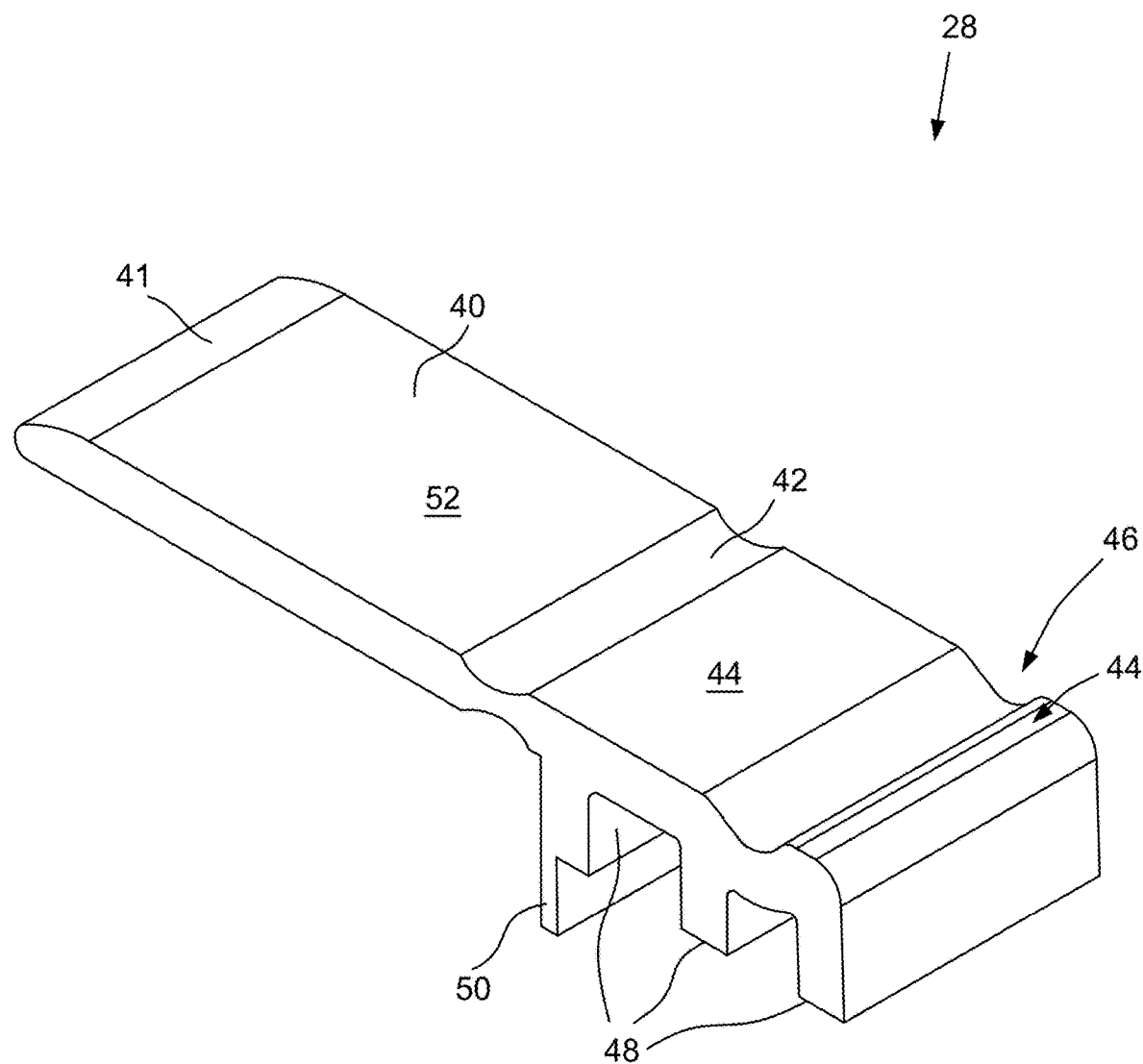
FIG. 3 is a perspective view of a floor support of the lift assist device of FIG. 1.

As the weight of the slide-out room 14 borne by the deflecting portion 40 increases, the deflecting portion 40 of the floor support 28 begins to compress the biasing block 30, thereby allowing the deflecting portion to begin pivoting or otherwise deflecting downwardly with respect to the base 20. As the slide out room 14 approaches full extension, for example, as shown in FIG. 2D, the inner end of the floor 16 of the slide out room 14 is drawn outboard of and clears the fixed portion 38 of the floor support 28, and thus becomes substantially disposed on the deflecting portion 40, further increasing the load on the deflecting portion. In turn, the deflecting portion 40 further compresses the biasing block 30, thereby allowing further pivoting or other deflection of the deflecting portion with respect to the base 20. The base 20, the deflecting portion 40, the biasing block 30, and the slide out room 14 are configured so that the slide out room, when fully extended, causes the deflecting portion to compress the biasing block a sufficient amount and thereby pivot a sufficient amount to lower the floor 16 of the slide out room at its inner edge to a level substantially flush with the floor 18 of the RV 12.

Retraction of the slide out room 14 into the RV 12 has the opposite effect. More specifically, as the slide out room 14 is initially retracted from the fully extended position, the inner edge of the floor 16 of the slide out room 14 rides up the deflecting portion 40 from the lowered position, for example, as shown in FIG. 2D, to a raised position wherein the underside of the slide out room may ride upon the fixed portion 38, for example, as shown in FIG. 2C. The beveled free ends 17, 41 of the floor 16 of the slide out room 14 and the deflecting portion 40, respectively, may facilitate this interaction. As the inner edge of the floor 16 of the slide out room 14 rides up the deflecting portion 40 and onto the fixed portion 38, the vertical load on the deflecting portion decreases, thereby allowing the biasing block 30 to decompress.

Consequently, the decompressing biasing block 30 causes the deflecting portion 40 to pivot or otherwise deflect upwardly toward its initial configuration wherein the upper surface 52 of the deflecting portion may be generally parallel to the upper surface 44 of the fixed portion 38. The foregoing decompression of the biasing block 30 and resultant pivoting or other deflection of the deflecting portion 40 may help lift the slide out room 14 to an elevated position to facilitate transition of the floor 16 of the slide out room 14 onto the fixed portion 38, thereby facilitating the retraction of the slide out room into the RV 12.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A lift assist device for use with a structure having a structure floor, the structure floor defining an edge; a wall defining an opening; and a slide-out compartment having a compartment floor, the slide-out compartment configured to reciprocate through the opening between a retracted position in which the compartment floor is disposed above the structure floor and an extended position in which the compartment floor is disposed substantially level with the structure floor, the lift assist device comprising:
 a biasing member;
 a base configured to receive and retain the biasing member; and
 a floor support including a fixed portion configured for connection to the structure and a deflecting portion connected to the fixed portion,
 wherein the biasing member is disposed between the base and the deflecting portion, and the biasing member is configured to bias the deflecting portion in a first deflection direction with respect to the base.

2. The device of claim 1, further comprising a hinge portion disposed between the fixed portion and the deflecting portion.

3. The device of claim 2, wherein the hinge portion comprises a region of reduced thickness compared to thicknesses of the fixed portion and the deflecting portion, respectively, adjacent the hinge portion.

4. The device of claim 3, wherein the fixed portion, the deflecting portion, and the hinge portion comprise the same material.

5. The device of claim 4, wherein the fixed portion, the deflecting portion, and the hinge portion are monolithically formed with each other.

6. The device of claim 2, wherein the hinge portion comprises a flexible material disposed between the fixed portion and the deflecting portion, wherein both the fixed portion and the deflecting portion are made of a material different from the flexible material.

7. The device of claim 1, wherein the deflecting portion is cantilevered from the fixed portion.

8. The device of claim 7, wherein the deflecting portion is bendably connected to the fixed portion.

9. A lift assist device for a slide-out room including a floor that is displaceable between an extended position and a retracted position relative to a structure, the lift assist device comprising:
 a base;
 a floor support cooperable with the base and including a fixed portion and a deflecting portion that is displaceable relative to the fixed portion; and
 a biasing member interposed between the deflecting portion of the floor support and the base,
 wherein the deflecting portion is configured to be pivoted into the biasing member by the slide-out room when the floor of the slide-out room is displaced from the fixed portion to the deflectable portion.

10. The device of claim 9, wherein the base comprises a horizontal first wall and a vertical second wall engageable with the structure such that the base is L-shaped.

11. The device of claim 10, wherein the base further comprises a vertical third wall spaced from and parallel to the second wall, and wherein the biasing member is disposed in the space between the third wall and the second wall.

12. The device of claim 9, wherein the floor support is made of or comprises an inherently lubricious material.

13. The device of claim 9, wherein the floor support comprises a plurality of legs having free ends defining a lower surface of the floor support, the floor support further comprising a flange extending from one of the legs or otherwise from the fixed portion and engaging the base.

14. The device of claim 9, wherein a free end of the deflecting portion is beveled.

15. The device of claim 9, wherein the floor support further comprises a hinge portion between the fixed portion and the deflecting portion, and wherein the deflecting portion is configured to be pivoted into the biasing member by the slide-out room when the floor of the slide-out room is displaced from the fixed portion beyond the hinge portion.

16. The device of claim 15, wherein the fixed portion, the hinge portion and the deflecting portion are integrally formed.

17. The device of claim 15, wherein the hinge portion comprises a flexible and resilient material, and wherein the fixed portion and the deflecting portion are formed of a material different from the hinge portion.

\* \* \* \* \*